United States Patent [19]

John

[11] 3,795,412
[45] Mar. 5, 1974

[54] VEHICLE OCCUPANT RESTRAINT SYSTEM

[76] Inventor: Andrew E. John, 7315 Asman Ave., Los Angeles, Calif. 91304

[22] Filed: June 16, 1972

[21] Appl. No.: 263,405

[52] U.S. Cl............................ 280/150 AB, 180/91
[51] Int. Cl. ........................................... B60r 21/08
[58] Field of Search ..... 280/150 B, 150 AB; 180/91

[56] References Cited
UNITED STATES PATENTS

| | | | |
|---|---|---|---|
| 3,687,485 | 8/1972 | Campbell ....................... | 280/150 B |
| 2,025,822 | 12/1935 | Pryor............................... | 280/150 B |
| 3,692,327 | 9/1972 | Barrick et al. .................... | 296/84 K |
| 3,663,037 | 5/1972 | Wohn-Maghowski........... | 280/150 B |
| 3,443,824 | 5/1969 | Dietrich .......................... | 280/150 B |
| 3,708,179 | 1/1973 | Hulten........................... | 280/150 AB |

FOREIGN PATENTS OR APPLICATIONS
1,937,223  1/1970  Germany........................ 280/150 B Primary Examiner—Kenneth H. Betts
Assistant Examiner—J. D. Rubenstein
Attorney, Agent, or Firm—Roger A. Marrs

[57] ABSTRACT

A vehicle safety device is disclosed herein for protecting occupants during an accident having a roof housing for storage of a plurality of inflatable, spaced apart tubes carrying a sleeve of netting material adapted to surround and confine the occupants upon deployment. Deployment is achieved upon the occurrence of an accident by releasing a pressurized gas coupled to the tubes for inflation thereof and rapid extension of the netting from the housing. The netting and inflated tubes are positioned about the occupants and the back of the seat to restrain the occupants from forward or lateral movement.

10 Claims, 9 Drawing Figures

PATENTED MAR 5 1974
3,795,412
SHEET 1 OF 2
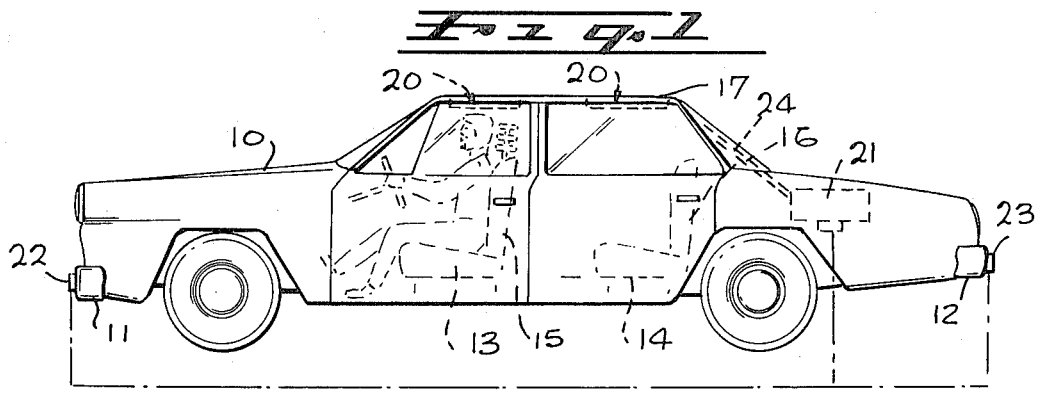
Fig. 1
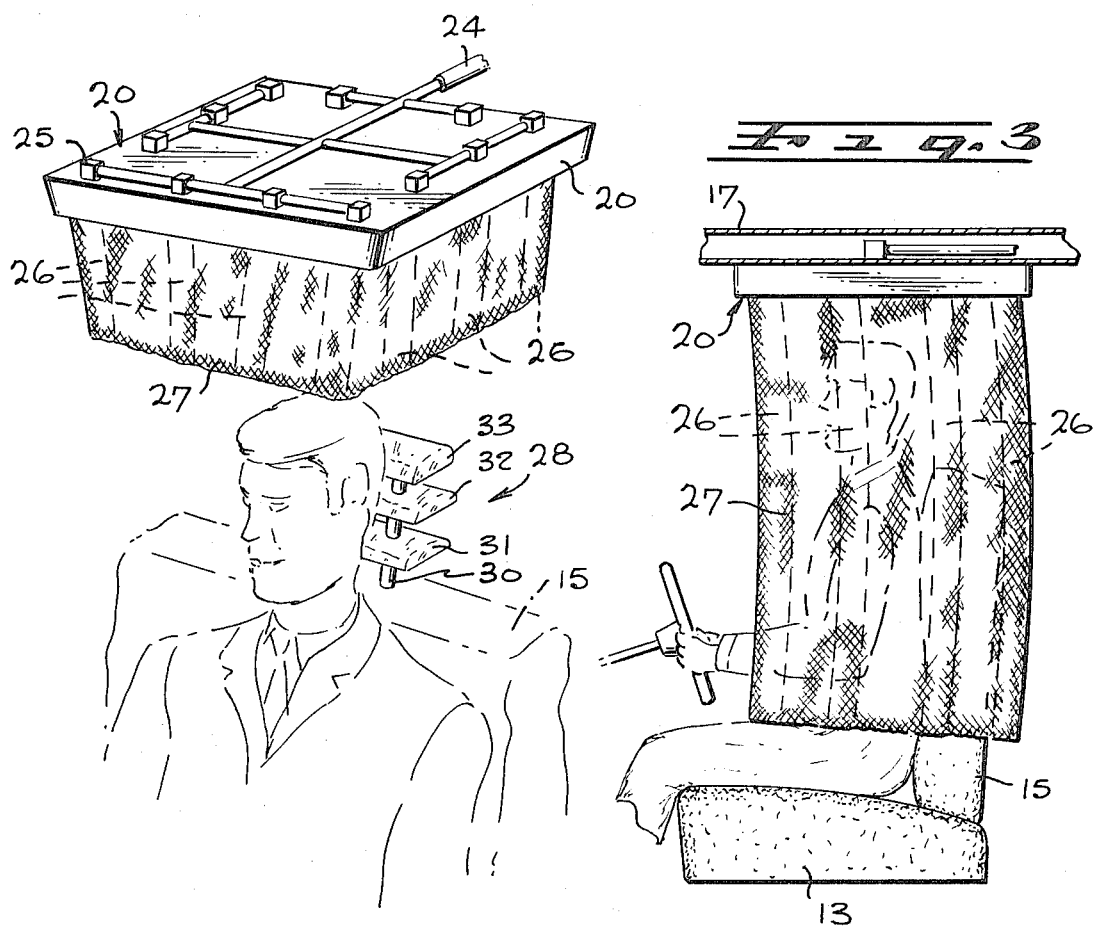
Fig. 2
Fig. 3

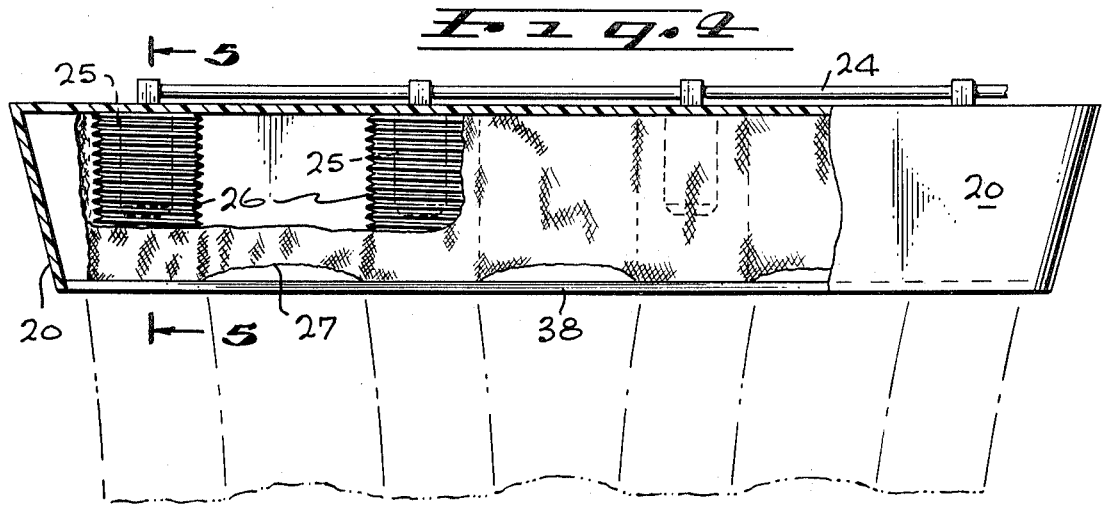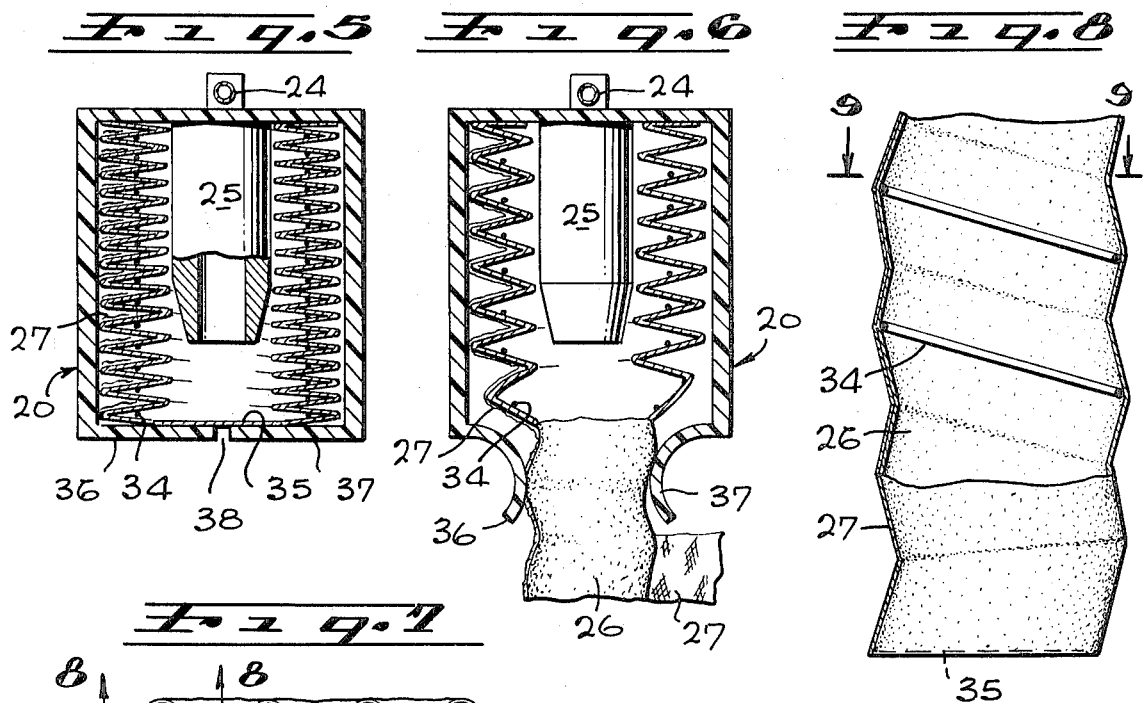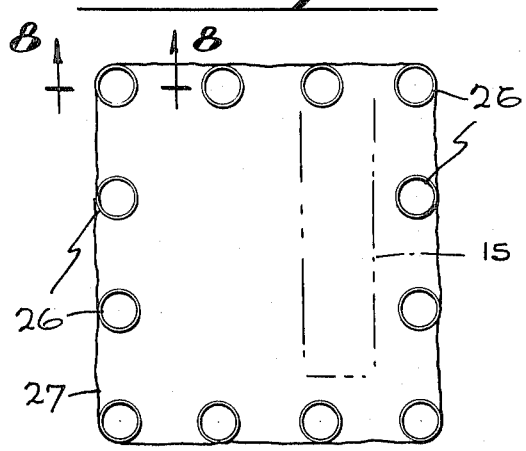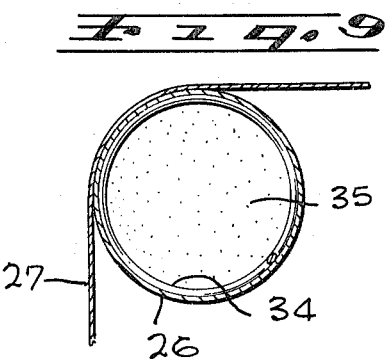

VEHICLE OCCUPANT RESTRAINT SYSTEM

BACKGROUND OF THE INVENTION

1. Field of the Invention

In general, the present invention relates to personnel restraint systems for minimizing injuries to passengers of a vehicle during accidents and, more particularly, to a novel extendable netting positionable about the occupants of a vehicle upon the sensed occurrence of an accident so as to avoid adverse effects of rapid deceleration.

2. Description of the Prior Art

In the past, it has been the conventional practice to employ an inflatable gas-filled confinement to improve the chances of passenger survival during the occurrence of an accident involving a vehicle. In general, the gas-filled confinement takes the form of a bag normally stored beneath the dashboard of the vehicle which is rapidly inflated upon the occurrence of an accident so that the expanded bag occupies a substantial portion of the interior of the vehicle between the occupant and the windshield, steering wheel and dashboard of the vehicle. Such a device is shown in U.S. Patent No. 3,606,377 wherein it is further disclosed that the source of gas utilizes a chemical, electro-chemical or pyro-technic reaction to generate a quantity of gas for inflating the bag.

Other attempts have been made to restrain or confine the passengers of a vehicle by inflation systems such as is disclosed in U.S. Patent No. 3,588,142 wherein the inflatable bag is carried on the roof of the vehicle and deployed immediately in front of the occupant and slightly to his side. This latter system further includes instruments for sensing the occurrence of the accident and means responsive to the sensing means for deploying the inflatable bag directly into the passenger compartment of the vehicle.

Difficulties and problems have been encountered when employing inflatable bags such as those disclosed in the prior art patents mentioned above which stem largely from the fact that inflation of the bag is so rapid that extremely loud and ear-irritating noise results and the vision of the occupants, including the driver, is considerably obscured. Furthermore, these conventional inflatable bag systems are not generally reusable and certainly cannot be employed for secondary accidents which occur immediately after the initial accident initially deploying the inflatable bag. The entire general idea of using rapidly expanding inflatable bags is extremely unnatural and quite confusing to the occupants who experience startling reactions. A further problem resides in the fact that these prior art restraining systems do not effectively prevent lateral body movements and do not normally have a tendency to hold the occupant in his seat by completely surrounding the occupant and the seat.

Therefore, there has been a long standing need to provide a safety device for completely surrounding the occupant at the time of an accident whereby restraint is achieved in all directions and without obscuring the vision of the driver.

SUMMARY OF THE INVENTION

Accordingly, the above difficulties and problems are obviated by the present invention which provides an enveloping shield carried by inflatable tubes which are arranged to be deployed by introduction of a high pressure gas thereto. The shield may take the form of a netting material of angular weave so that visibility is not impaired and the netting is deployable about the occupant of the vehicle and the back of the seat supporting the occupant. Instrumentation may be connected to the source of pressurized gas for automatically releasing the gas upon the sensing of impact. A housing is carried on the roof of the vehicle immediately above the occupant intended to be surrounded by the netting and the housing contains means for permitting the release of the netting from its storage position therein upon inflation of the tubes.

Therefore, it is among the primary objects of the present invention to provide a novel personnel restraint system for vehicles employing a porous netting adapted to be deployed so as to completely surround the occupant and the back of the seat upon which the occupant is seated.

Another object of the present invention is to provide a novel deployable restraint system for vehicles employing a pressurized gas to extend inflatable members carrying a netting whereby the netting completely surrounds the occupant and restrains the occupant from encountering dangerous deceleration loads.

Still another object of the present invention is to provide a deployable porous shield for surrounding the back of the seat and its occupant wherein forward and lateral movements of the occupant are substantially retarded and wherein visibility is readily available so that operation of the vehicle is not impaired.

Yet another object of the present invention is to provide a novel restraint system for occupants of a vehicle which is economical to manufacture, easy to install and one which permits normal operation of the vehicle when deployed.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a diagrammatic view, in side elevation, of an automobile incorporating the vehicle occupant restraint system of the present invention;

FIG. 2 is an enlarged perspective view of the vehicle occupant restraint system of the present invention employed in the vehicle shown in FIG. 1 and illustrated as being partially deployed above the occupant;

FIG. 3 is a side elevational view of the restraint system shown in FIG. 2 and illustrated as being substantially deployed about the occupant and the back of the seat;

FIG. 4 is an enlarged view of the restraint system housing and illustrating portions thereof broken away to illustrate the plurality of inflatable tubes and the continuous netting;

FIG. 5 is a cross-sectional view of the housing illustrating the storage of the tubes and netting as taken in the direction of arrows 5—5 of FIG. 4;

FIG. 6 is a view similar to the view of FIG. 5 illustrating expansion of the inflatable tubes during initiation of the system;

FIG. 7 is a plan view of the restraint system illustrating the disposition of the netting about the seat and its occupant;

FIG. 8 is a view of a typical inflatable tube employed in the system of the present invention and as taken in the direction of arrows 8—8 of FIG. 7;

FIG. 9 is a transverse cross-sectional view of the tube shown in FIG. 8 as taken in the direction of arrows 9—9 thereof.

DESCRIPTION OF THE PREFERRED EMBODIMENT

Referring to FIG. 1, a vehicle 10 is illustrated in the form of a conventional automobile having front and rear bumpers 11 and 12, respectively, and a front seat 13 and a rear seat 14. Each of the respective seats 13 and 14 are provided with back sections 15 and 16, respectively. The vehicle further includes a roof structure 17 which is supported from the main body of the vehicle in a conventional manner. It is to be noted that the seats 13 and 14 are adapted for accommodating a driver for operating the vehicle and a number of passengers.

In accordance with the present invention, the vehicle restraint system is primarily contained within a housing 20 carried on the underside of the roof structure 17 immediately above the driver and/or passenger position. It is to be understood that additional restraint system housings may be located above other occupants within the vehicle; however, only a single such system wil be described with respect to the operator or driver of the vehicle. The housing 20 is employed for storage of the system prior to deployment in the event of an accident. For deployment purposes, a supply 21 of high pressure gas is carried on the vehicle and is energized or activated by means of sensors 22 and 23 located on the front and rear bumpers of the vehicle. It is to be understood that the sensors may be placed in other critical locations; however, by placing the sensors on the bumpers, the most critical locations are employed for illustrative purposes. The restraint system housing 20 is operably connected to the source of pressurized gas 21 by a manifold 24 suitable for conducting the high pressure gas to the restraint system upon actuation by the sensors. Any suitable instrumentation may be employed for the sensors and actuator units which encompasses both electrical and mechanical devices, such as strain gauges, pyro-technic devices or the like.

Referring now in detail to FIG. 2, it can be seen that the manifold 24 supplies the pressurized gas to a plurality of headers, such as header 25, arranged along the top of the housing 20. The high pressure gas is employed for inflating and therefore, extending a plurality of tubes such as is represented by tube 26. The plurality of tubes are normally stored in a folded or non-inflated position within the housing 20 and, upon inflation by the introduction of the pressurized gas, the plurality of tubes extend out of the housing 20 to surround the vehicle's operator and seat back 15. As the plurality of tubes downwardly depend from housing 20, a porous netting 27 is carried about the occupant and the back of the seat 15 by the plurality of tubes. Netting 27 is endless and will completely surround the occupant and back of the seat 15 including the headrest indicated in the general direction of arrow 28. Netting 27 is suitably attached to an outside peripheral portion of each of the plurality of tubes 26 so that the netting will follow the downward movement thereof. The netting 27 is preferably of a very large mesh so that the operator of the vehicle can see through the netting. It is contemplated by the present invention that a portion of the netting immediately forward of the driver's face may be provided with a small transparent window composed of plastic or the like. The plurality of tubes 26 are preferably composed of a polyvinyl plastic whereas the netting 27 may be composed of any suitable fabric material, plastic strips, nylon line or the like.

It is to be noted that the headrest 28 includes a support or stanchion 30 that is repeated on the opposite side of the headrest wherein the stanchions are supported in an upright position from the seat back 15. The headrest 28 includes at least three tiers of foam material as represented by numerals 31, 32 and 33, respectively. The tiers of foam material are arranged in fixed spaced apart relationship with respect to each other so that the driver of the vehicle has rearward visibility to look past the headrest. Construction in this manner provides a headrest which does not obstruct the rear view of the driver.

Referring now to FIG. 3, the netting 27 is illustrated as being fully deployed and downwardly depending from housing 20. The netting is semi-rigidly supported by the inflated and extended lengths of tubing 26. As the tubes are deployed by the introduction of pressurized gas, the net or netting 27 is drawn out between the tubes and it is to be noted that the run of fabric comprising the net weave is angled so that when the net is fully deployed, the tubes are drawn somewhat together. Preferably, the plurality of tubes are arranged so as to extend downwardly at an outward angle so that if a person is not located in the center of his seat, he will still be confined within the restraining netting once it has been fully deployed. Since the netting extends to the leg area of the occupant of the seat, this will restrain a small person as well as a large person. When the netting reaches full deployment, residual tube pressure continues to restrain the occupant or person in the event of secondary collisions. If the deceleration forces exceed allowable rates, the body of the person forces the netting to collapse the tubes. As the deceleration decreases, the residual tube pressure will again expand and harden the tubes to reposition the occupant. Also, FIG. 3 more clearly illustrates that the fully deployed tubes and netting extend from the front of the occupant to a location behind the seat back 15 as well as on either side of the occupant. Preferably, the netting is of a large enough mesh so that not only is visibility unobstructed and restraint provided for the extremities of the occupant, but the mesh is small enough to prevent glass or other fragments of the vehicle from penetrating the protection of the netting at the time of the accident.

Referring now in detail to FIG. 4, the plurality of tubes 26 and the netting 17 are shown in their storage condition within the housing 20 in solid lines. In broken lines, the plurality of tubes are illustrated in their deployed conditions as well as netting 17. It is to be seen that the source of pressurized air via manifold 24 is introduced to the interior of the tubes by headers 25. Obviously, the free ends of the tubes are closed so that the gas will not escape. To provide rigidity for the tubes, each tube is provided with a spiral spring indicated by numeral 34 which is compressed when the tubes and netting are in their stored condition. The end of each tube not closed off is secured about the respective headers 25 associated with the source of pressurized gas and is provided with an airtight seal against the housing 20 so that the high pressure gas will not escape.

In FIG. 5, a single tube of the plurality is illustrated in its folded and stored condition coaxially disposed about the header 25. The tube is indicated at its closed end by numeral 35 which resides adjacent a pair of bendable doors or lips 36 and 37, respectively. The doors are separated at their adjacent sides by a small gap 38 through which the closed end 35 wedges itself upon pressurization of the tube.

As indicated in FIG. 6, the pressurized tube extends through gap 38 and forces the doors 36 and 37 outwardly to permit passage of the tube and netting.

With respect to FIG. 7, it can be seen that the netting 27 completely surrounds the back of the seat 15 and the occupant of the seat. The plurality of tubes are arranged in spaced relationship with respect to each other and are totally interconnected by the netting 27. In FIG. 8, it can be seen that the spring 34 expands outwardly and semi-rigidifies the tube 26 while in FIG. 9, it can be seen that the netting 27 may be attached to the tube 26 by any suitable means, such as adhesive, bonding agent, sewn fibers or the like.

Therefore, the vehicle restraining system of the present invention provides an improved means for restraining the occupant in his seat during an accident in which the vehicle is involved. The vision of the vehicle's operator is not impaired and his hands and legs are able to operate the controls of the vehicle. The angular weave of the cross-fibers of netting 27 serve to yieldably restrain the occupant and cause the semi-rigid inflatable tubes to draw towards the occupant when the tubes are fully extended.

It is to be understood that although the restraining system is primarily described with respect to the operator of the vehicle, the same system may be employed for occupants of the vehicle's rear seat as well. It is also to be understood that a separate restraining system can be provided for each occupant in a seat or that three or more occupants may be surrounded by one restraining system.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A personnel restraining apparatus for minimizing injury to an occupant of a vehicle during the occurrence of an accident comprising the combination of:
   a low profile housing carried on the underside of the roof of the vehicle immediately over the occupant and the back of the seat supporting the occupant;
   said housing having a continuous peripheral opening defined by a pair of opposing pliable doors;
   a plurality of inflatable tubes having a stored condition within said housing and an extended condition downwardly depending through said continuous opening about the occupant and the seat back;
   a netting carried by said plurality of tubes and surrounding the occupant and the seat back when said plurality of tubes are in their extended condition; and
   means carried on the vehicle operably connected to said plurality of tubes for introducing a pressurized fluid thereto to forceably urge said plurality of tubes through said continuous opening.

2. The invention as defined in claim 1 wherein each tube of said plurality is closed at its extended end and further includes resilient means normally biasing said tube against said doors.

3. The invention as defined in claim 2 wherein said netting is of sufficient wide mesh to provide occupant visibility and of sufficient narrow mesh to prevent passage of flying debris encountered during the occurrence of an accident.

4. The invention as defined in claim 3 wherein said netting is composed of an angular weave whereby said tubes are slightly drawn inward when fully extended, said angular weave providing a normal inward bias for said tubes in said extended condition.

5. The invention as defined in claim 4 wherein said tubes are of sufficient length to reach the lap of the occupant.

6. The invention as defined in claim 5 wherein said netting further includes a sheet of transparent material immediately ahead of the face of the occupant when said tubes and netting are extended.

7. The invention as defined in claim 3 including a manifold network interconnecting each of said tubes with said pressurized fluid means for simultaneously extending all of said tubes as a unit.

8. The invention as defined in claim 7 including sensing means carried on the vehicle and operably connected to said pressurized fluid means for actuating said latter means in response to the occurrence of an accident.

9. The invention as defined in claim 8 wherein said plurality of tubes comprise at least twelve tubes and said tubes in said extended condition embrace the upper torso of the occupant, the seat back and the headrest.

10. The invention as defined in claim 9 wherein said housing doors are composed of yieldable material permitting said tubes and said netting to be forced through said continuous opening upon inflation of said tubes.

* * * * *